United States Patent
Takano et al.

(10) Patent No.: US 10,265,895 B2
(45) Date of Patent: Apr. 23, 2019

(54) DECORATIVE SHEET FOR THREE-DIMENSIONAL MOLDING AND METHOD FOR PRODUCING SAME, AND DECORATIVE MOLDED ARTICLE USING DECORATIVE SHEET AND METHOD FOR PRODUCING SAME

(75) Inventors: Mari Takano, Tokyo (JP); Nobuo Saitou, Tokyo (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 488 days.

(21) Appl. No.: 14/007,446

(22) PCT Filed: Mar. 23, 2012

(86) PCT No.: PCT/JP2012/057617
§ 371 (c)(1),
(2), (4) Date: Dec. 24, 2013

(87) PCT Pub. No.: WO2012/133234
PCT Pub. Date: Oct. 4, 2012

(65) Prior Publication Data
US 2014/0302293 A1    Oct. 9, 2014

(30) Foreign Application Priority Data

Mar. 25, 2011   (JP) .................................. 2011-068803
Mar. 25, 2011   (JP) .................................. 2011-068804

(51) Int. Cl.
*B32B 7/12*        (2006.01)
*B29C 45/16*       (2006.01)
(Continued)

(52) U.S. Cl.
CPC .... *B29C 45/1671* (2013.01); *B29C 45/14811* (2013.01); *B29C 51/10* (2013.01);
(Continued)

(58) Field of Classification Search
CPC ........... B29C 45/14811; B29C 45/1671; B29C 51/10; B32B 15/09; B32B 27/08;
(Continued)

(56) References Cited

U.S. PATENT DOCUMENTS 4,199,421 A * 4/1980 Kamada ................... C09D 4/00
                                                      522/168
6,350,523 B1 * 2/2002 Schwalm .............. C08F 290/06
                                                      427/496
(Continued)

FOREIGN PATENT DOCUMENTS

JP        50-19132       2/1975
JP        01024809 A *   1/1989
(Continued)

OTHER PUBLICATIONS

JP 2009083301 A Machine Translation.*
(Continued)

*Primary Examiner* — Travis M Figg
(74) *Attorney, Agent, or Firm* — Locke Lord LLP

(57) ABSTRACT

The decorative sheet for three-dimensional molding includes a thin metal film layer, a surface protection layer, and a base film, at least the thin metal film layer and the surface protection layer being disposed on the base film in this order, in which the surface protection layer consists of a cured material of an ionizing radiation curable resin composition containing a polycarbonate(meth)acrylate and/or an acrylic silicone (meth)acrylate. The decorative sheet for three-dimensional molding, which has excellent moldability, provides a decorative molded article with a metallic style in excellent design and with excellent abrasion resistance.

14 Claims, 2 Drawing Sheets

(51) Int. Cl.
| | |
|---|---|
| *B29C 45/14* | (2006.01) |
| *B32B 37/00* | (2006.01) |
| *B29C 51/10* | (2006.01) |
| *B32B 38/10* | (2006.01) |
| *B32B 7/06* | (2019.01) |
| *B32B 15/09* | (2006.01) |
| *B32B 27/08* | (2006.01) |
| *B32B 27/16* | (2006.01) |
| *B32B 27/30* | (2006.01) |
| *B29K 705/00* | (2006.01) |
| *B32B 37/26* | (2006.01) |

(52) U.S. Cl.
CPC ............... *B32B 7/06* (2013.01); *B32B 7/12* (2013.01); *B32B 15/09* (2013.01); *B32B 27/08* (2013.01); *B32B 27/16* (2013.01); *B32B 27/308* (2013.01); *B32B 37/025* (2013.01); *B32B 38/10* (2013.01); *B29K 2705/00* (2013.01); *B29K 2995/0087* (2013.01); *B32B 2037/268* (2013.01); *B32B 2255/04* (2013.01); *B32B 2255/10* (2013.01); *B32B 2255/26* (2013.01); *B32B 2307/412* (2013.01); *B32B 2307/51* (2013.01); *B32B 2307/54* (2013.01); *B32B 2307/748* (2013.01); *B32B 2309/10* (2013.01); *B32B 2310/0831* (2013.01); *B32B 2310/0887* (2013.01); *B32B 2311/00* (2013.01); *B32B 2605/08* (2013.01); *Y10T 428/24942* (2015.01); *Y10T 428/31507* (2015.04); *Y10T 428/31663* (2015.04)

(58) Field of Classification Search
CPC ..... B32B 27/16; B32B 27/308; B32B 37/025; B32B 38/10; B32B 7/06; B32B 7/12; B32B 2037/268; B32B 2255/04; B32B 2255/10; B29K 2705/00; B29K 2995/0087
See application file for complete search history.

(56) References Cited

U.S. PATENT DOCUMENTS

| | | | |
|---|---|---|---|
| 6,544,369 B1 | 4/2003 | Kitamura et al. | |
| 2001/0049022 A1* | 12/2001 | Takeuchi | B32B 27/00 428/423.1 |
| 2005/0019591 A1 | 1/2005 | Francois | |
| 2011/0045284 A1* | 2/2011 | Matsukawa | B29C 45/1418 428/336 |

FOREIGN PATENT DOCUMENTS

| | | |
|---|---|---|
| JP | S64-24809 | 1/1989 |
| JP | 3-181517 | 8/1991 |
| JP | 6-100799 | 4/1994 |
| JP | 6-134859 | 5/1994 |
| JP | 2000-351843 | 12/2000 |
| JP | 2003-145573 | 5/2003 |
| JP | 2005-246891 | 9/2005 |
| JP | 2009-83300 | 4/2009 |
| JP | 2009-83301 | 4/2009 |
| JP | 2009083301 A * | 4/2009 |
| JP | 2009-220318 | 10/2009 |
| JP | 2009-241368 | 10/2009 |
| JP | 2010-125800 | 6/2010 |
| JP | 4542667 | 9/2010 |
| JP | 2010-234347 | 10/2010 |
| JP | 2010222568 A | 10/2010 |
| JP | 2010234347 A1 * | 10/2010 |
| JP | 2011-73373 | 4/2011 |
| JP | 2011-73380 | 4/2011 |
| JP | 2011-79178 | 4/2011 |
| JP | 2011073373 A * | 4/2011 |
| JP | 2011-213003 | 10/2011 |
| KR | 10-2010-0124291 A1 | 11/2010 |
| WO | 2004091908 | 10/2004 |
| WO | WO 2009/122786 A1 | 10/2009 |

OTHER PUBLICATIONS

Definition of Foil.*
JP 01024809 A_Machine Translation.*
JP 2010234347 A1 translation.*
JP-2011073373-A Machine Translation (Year: 2011).*
Office Action dated Oct. 28, 2015, for counterpart Chinese Application No. 201280020448.9.
Supplemental Partial European Search Report for Application No. EP 12 76 5433, dated May 1, 2015.
Communication dated May 14, 2015, for Chinese Patent Application No. 201280020448.9, and English language translation thereof.
Chinese Official Action dated Sep. 18, 2014, for CN Application No. 201280020448.9.
Japanese Official Action dated Sep. 30, 2014, for JP Application No. 2011-068803.
Japanese Official Action dated Sep. 30, 2014, for JP Application No. 2011-068804.
Office Action dated Jan. 18, 2018, for corresponding Korean Patent Application No. 10-2013-7025412.

* cited by examiner

DECORATIVE SHEET FOR THREE-DIMENSIONAL MOLDING AND METHOD FOR PRODUCING SAME, AND DECORATIVE MOLDED ARTICLE USING DECORATIVE SHEET AND METHOD FOR PRODUCING SAME

TECHNICAL FIELD

The present invention relates to a decorative sheet for three-dimensional molding and a method for producing the same, and a decorative molded article formed by using a decorative sheet and a method for producing the same. More specifically, the present invention relates to a decorative sheet for three-dimensional molding and a method for producing the same, and a decorative molded article formed by using a decorative sheet and a method for producing the same so as to provide a decorative molded article with a metallic style in excellent design and with excellent abrasion resistance.

BACKGROUND ART

A plastic product designed with metallic style is used as the substitute of an article such as a car grill with chromed appearance and widely used, mainly in the automobile industry from the viewpoint of the superiority including the flexible shape, the strong corrosion resistance, lightweight, or the low price compared with metal. As a process of providing metallic luster to the surface of such a resin-molded article, particularly a molded article with a three-dimensional curve or shape, plating or painting is conducted after molding. This process requires environmental measures to wastewater, solvent vapor, and the like and suffers from height cost and the like.

In recent years, a metallic luster sheet has been used to make a molded product with a metallic luster surface by insert molding (for example, Patent documents 1 and 2).

However, in such a resin-molded article with a metallic luster surface, even a negligible damage decreases the gloss and causes whitening.

On the other hand, a decorative molded article decorated by laminating a decorative sheet on the surface is used in various applications such as automotive interior parts. The method of forming such a decorative molded article includes insert molding in which a decorative sheet is previously three-dimensionally formed with a vacuum forming mold, and then the molded sheet is inserted in an injection mold and fluidized resin is injected in the injection mold to integrate this resin with the molded sheet; and simultaneous injection-molding and decorating in which a decorative sheet inserted in a mold is integrated with a melted resin injected in the cavity during injection molding to decorate the surface of the resin-molded article (for example, Patent document 3).

The above-mentioned decorative molded article is provided with a surface protection layer in order to improve the damage resistance on the surface. However, the above-mentioned method of forming such a decorative resin-molded article has a problem in the process of previously three-dimensionally forming a decorative sheet with a vacuum forming mold in insert molding and in the process of drawing and firmly attaching a decorative sheet along the inner periphery of the cavity during preforming or during injecting a melted resin in simultaneous injection-molding and decorating. Specifically, the decorative sheet is drawn more than minimum requirement to fit the shape of the mold due to the effect of vacuum or compressed air or due to the tension or the like generated by the pressure and the shear stress of the melted resin, resulting in a crack generated on the surface protection layer on the curved surface of a molded article.

To approach the above-mentioned problems, an ionizing radiation curable resin such as an ultraviolet curable resin has been used as the surface protection layer for increasing the cross-link density of the resin forming the surface protection layer of a decorative sheet so as to attempt to improve the abrasion resistance and the damage resistance of the surface of a decorative molded article. However, the problem of a crack generated on the curved surface of a molded article during the forming still exists.

Alternatively, an ionizing radiation curable resin such as an ultraviolet curable resin used as the surface protection layer has been attempted to be half-cured at the stage of the formation of a decorative sheet and then fully cured after integrated with the decorative sheet (see Patent document 4). However, problems are created, in which the surface protection layer containing an uncured resin component is easily damaged and hardly handled and in which the mold is contaminated due to the uncured resin component adhering to the mold. To solve these problems, a protection film may be provided on a half-cured surface protection layer. However, this complicates the manufacturing process and increases the cost.

Therefore, the surface protection layer with damage resistance as well as three-dimensional moldability is desired.

A resin composition containing a polycarbonate (meth) acrylate is known (for example, Patent documents 5 and 6), and a resin composition containing a small amount of yellowing polycarbonate urethane acrylate oligomer is used for the inner colored sheet on the back side of a transparent sheet provided on the surface of a decorative sheet for insert molding (Patent document 7). However, no polycarbonate (meth)acrylates were used for the surface protection layer of a decorative sheet.

An acrylic silicone resin has the structure in which the acrylic polymer chain is strongly cross-linked by a siloxane bond, providing excellent weatherability, heat resistance, chemical resistance, and water resistance so as to be widely used in exterior paint. However, if an acrylic silicone resin is used as the surface protection layer in order to improve the damage resistance on the surface of a resin-molded article, the formed film becomes hard and fragile, possibly causing a crack. To prevent a crack from being generated, a curing process such as ultraviolet curing is applied to a sheet for insert molding after vacuum forming or to a resin molded article after injection molding when an acrylic silicone resin is used as the surface protection layer (for example, see Patent documents 8).

However, the curing process applied to a three-dimensionally molded article is complicated with poor economical efficiency, hardly providing uniform curing.

Therefore, the surface protection layer, which has three-dimensional moldability as well as damage resistance while maintaining the excellent chemical resistance of the acrylic silicone resin, is desired.

CITATION LIST

Patent document 1: JP 2009-220318 A
Patent document 2: JP 4542667 B2
Patent document 3: JP 50-19132 B1
Patent document 4: JP 06-134859 A
Patent document 5: JP 03-181517 A Patent document 6: JP 2000-351843 A
Patent document 7: JP 2003-145573 A
Patent document 8: JP 06-100799 A

DISCLOSURE OF THE INVENTION

The present invention is achieved under such circumstances. The objective of the present invention is to provide a decorative sheet for three-dimensional molding and a method for producing the same, and a decorative molded article formed by using the decorative sheet, and a method for producing the same so as to provide a decorative molded article with a metallic style in excellent design and with excellent abrasion resistance.

As a result of their extensive studies to achieve the above-mentioned objective, the inventors found:

a sheet including a thin metal film layer, a surface protection layer, and a base film, at least the thin metal film layer and the surface protection layer being disposed on the base film in this order, in which the surface protection layer consists of a cured material of an ionizing radiation curable resin composition containing a polycarbonate(meth)acrylate and/or an acrylic silicone (meth)acrylate, can be adapted for the objective as the decorative sheet for three-dimensional molding. The present invention is achieved based on this finding.

Specifically, the present invention provides:

a decorative sheet for three-dimensional molding including a thin metal film layer, a surface protection layer, and a base film, at least the thin metal film layer and the surface protection layer being disposed on the base film in this order, in which the surface protection layer consists of a cured material of an ionizing radiation curable resin composition containing a polycarbonate(meth)acrylate and/or an acrylic silicone (meth)acrylate.

The present invention can provide a decorative sheet for three-dimensional molding and a method for producing the same, and a decorative molded article having a decorative sheet and a method for producing the same so as to provide a decorative molded article with a metallic style in excellent design and with excellent abrasion resistance.

PREFERRED MODE FOR CARRYING OUT THE INVENTION

Figure 1:
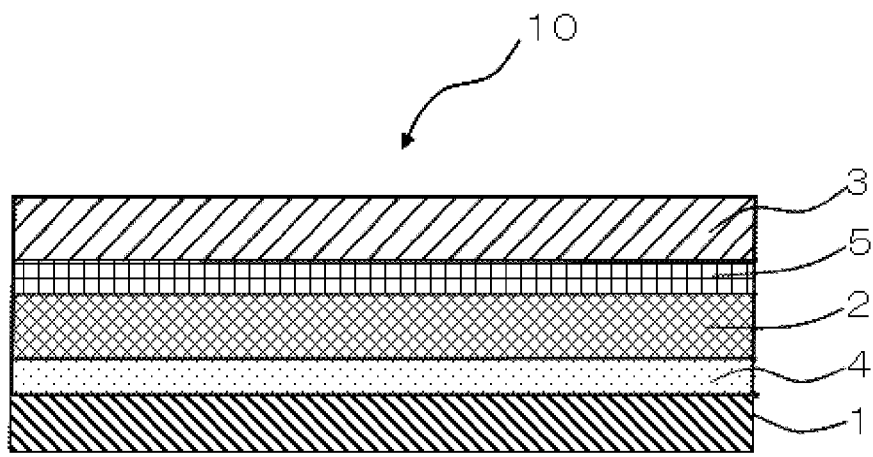
FIG. 1 shows a pattern diagram illustrating the cross section of the first aspect of the decorative sheet for three-dimensional molding of the present invention.

The decorative sheet for three-dimensional molding of the present invention will be explained.
Decorative Sheet for Three-Dimensional Molding The decorative sheet for three-dimensional molding of the present invention (hereinafter sometimes simply referred to as "decorative sheet") includes a thin metal film layer, a surface protection layer, and a base film, at least the thin metal film layer and the surface protection layer being disposed on the base film in this order, in which the surface protection layer consists of a cured material of an ionizing radiation curable resin composition containing a polycarbonate(meth)acrylate and/or an acrylic silicone (meth)acrylate. More specifically, in one aspect (hereafter sometimes referred to as "the first aspect") of the decorative sheet for three-dimensional molding of the present invention, the surface protection layer is firmly attached to a thin metal film layer directly or through a primer layer. In another aspect (hereafter sometimes referred to as "the second aspect") of the decorative sheet for three-dimensional molding of the present invention, a transparent film layer is disposed between the thin metal film layer and the surface protection layer.

Base Film

In the decorative sheet of the present invention, a base film used as the substrate is selected in consideration of the vacuum formability, for which a resin film consisting of a thermoplastic resin is typically used. As the thermoplastic resin, an acrylonitrile-butadiene-styrene resin (hereafter referred to as "ABS resin"), an acrylic resin, polyolefin resins such as polypropylene and polyethylene, a polycarbonate resin, a vinyl chloride resin and the like are generally used. Among these, a polyolefin resin, a polycarbonate resin, and an ABS resin are preferable.

The base film can be used as single-layer films of these resins or multi-layer films of the same or different kinds of resins.

The thickness of the base film is selected depending on the intended use but typically about 200-800 µm. In the second aspect of the decorative sheet of the present invention including a transparent film layer disposed between the thin metal film layer and the surface protection layer, the base film with a thickness of 200 µm or more can prevent the shape from being distorted due to the contraction of the below-mentioned transparent film layer after vacuum forming. On the other hand, the base film with a thickness of 800 µm or less, including or not including a transparent film layer, can prevent the handleability from being decreased due to the thickened decorative sheet. In addition to these viewpoints, given the cost and the like, the thickness of the base film is preferably 250-600 µm, more preferably 300-500 µm.

This base film may optionally be subjected to physical or chemical surface treatment by oxidation, unleveling, or the like to improve the adhesion to the layer provided on the sheet on one side or both sides, if desired.

The oxidation includes, for example, the corona discharge, the plasma, the chromium oxidation, the flame, the hot air, and the ultraviolet-ozone treatments. The unleveling includes, for example, the sandblasting and the solvent treatments. These surface treatments are optionally selected depending on the type of the base film. Generally, the corona discharge treatment is preferably used from the viewpoint of the effect, the operability, and the like.

On the base film, a primer layer may be formed, painting may be applied for adjusting the color, or a designed pattern may previously be formed.

Thin Metal Film Layer

The thin metal film layer in the decorative sheet of the present invention is provided between the base film and the surface protection layer in the first aspect of the present invention and provided on the base film side of the transparent film in the second aspect having the below-mentioned transparent film layer. The thin metal film layer adds to a design the decorative sheet by providing the decorative sheet has as high brightness as a metallic surface.

The metal allowing to be used in the present invention is not limited in particular to the extent of the effect of the present invention but includes aluminum, nickel, copper, silver, gold, platinum, tin, brass, indium, chromium, and zinc.

These metals may be used alone or in combination of two or more kinds. Among these metals, indium, tin, chromium, or aluminum is preferable. From the viewpoint of the excellent stretchability, tin and indium are particularly preferable. Materials with excellent stretchability have the advantage of not generating cracks even when the sheet is stretched in three dimensions.

The thin metal film layer of the present invention is formed in various ways but formed from the above-mentioned metal by deposition methods such as the vacuum deposition, the sputtering, and the ion plating methods. These methods are preferable for processing various materials so as to form a film with excellent decoration.

In the present invention, the vacuum deposition method is preferable from the viewpoint of low-cost and of no damages to materials to be deposited. The deposition condition is appropriately set according to the melting or the evaporating temperature of metal to be used.

Besides the above-mentioned deposition method, paste containing the above-mentioned metal can be applied.

The thickness of the thin metal film layer formed by a deposition method is the optical density (O.D) value is preferably about 0.5-3, more preferably about 0.8-1.5 from the viewpoint of the stretchability. On the other hand, the thickness of the thin metal film layer formed by applying the paste is preferably about 0.1-30 μm, more preferably 0.5-20 μm.

The thin metal film layer may be provided directly on the base film. The thin metal film layer provided on the one side of a support film is attached to the base film, and then the support film is peeled off to provide the thin metal film layer on the base film.

In the first aspect of the present invention, the thin metal film layer is firmly attached to the below-mentioned surface protection layer. Between these layers, there are no other resin layers including a transparent film layer of, for example, polyethylene terephthalate (PET). This can provide more excellent moldability as a three-dimensional decorative sheet. The other resin layers as described above does not exclude a primer layer and the like with a thickness of about 10 μm or less to be used to improve the adhesion between the thin metal film layer and the surface protection layer.

Surface Protection Layer

The surface protection layer of the decorative sheet of the present invention consists of a cured material of an ionizing radiation curable resin composition containing a polycarbonate(meth)acrylate and an acrylic silicone (meth)acrylate.

The ionizing radiation curable resin composition can contain a multi-functional (meth)acrylate.

The ionizing radiation curable resin composition is referred to as a composition containing an ionizing radiation curable resin. The ionizing radiation means electromagnetic rays or charged particle radiation with an energy quantum capable of polymerizing or cross-linking a molecule. Typically, as the ionizing radiation, ultraviolet rays (UV) or electron beams (EB) are used. Additionally, electromagnetic rays such as X rays and y rays and charged particle radiation including a rays and ion lines can also be used. The ionizing radiation curable resin refers to a resin which is cross-linked or cured through the above-mentioned ionizing radiation.

Polycarbonate(Meth)Acrylate

In the present invention, as the ionizing radiation curable resin, a polycarbonate(meth)acrylate or an acrylic silicone (meth)acrylate or the both are used. First, the polycarbonate (meth)acrylate will be explained.

In the present invention, the term "(meth)acrylate" means "acrylate or methacrylate." Other similar terms are also regarded as synonymous in this way.

The polycarbonate(meth)acrylate used in the present invention is limited in particular as long as having a carbonate bond in the polymer main chain and further having a (meth)acrylate at the end or the side chain. The (meth) acrylate has preferably two or more functional groups from the viewpoint of cross-linking and curing.

The above-mentioned polycarbonate (meth)acrylate is obtained, for example, by converting a part or all of the hydroxyl groups of a polycarbonate polyol to a (meth) acrylate (acrylic ester or methacrylic ester). This esterification can be conducted by a typical esterification reaction. For example, this esterification is conducted by 1) condensing a polycarbonate polyol together with an acrylic acid halide or a methacrylic acid halide in the presence of a base; 2) condensing a polycarbonate polyol together with an acrylic acid anhydride or a methacrylic acid anhydride in the presence of a catalyst; or 3) condensing a polycarbonate polyol together with acrylic acid or methacrylic acid in the presence of an acid catalyst.

The above-mentioned polycarbonate polyol has a carbonate bond in the polymer main chain and further has 2 or more, preferably 2-50, more preferably 3-50 hydroxyl groups at the end or the side chain. The polycarbonate polyol is typically generated through the polycondensation of a diol compound (A), a trivalent or higher polyvalent alcohol (B), and a compound to be the carbonyl component (C).

The diol compound (A) used as the raw material is represented by the general formula HO—$R_1$—OH. $R_1$ is a divalent hydrocarbon group with 2-20 carbon atoms and may include an ether bond. For example, $R_1$ is a normal or branched alkylene, a cyclohexylene, and a phenylene groups.

The specific example of the diol compound includes ethylene glycol, 1,2-propylene glycol, diethylene glycol, dipropylene glycol, triethylene glycol, polyethylene glycol, neopentyl glycol, 1,3-propanediol, 1,4-butanediol, 1,5-pentanediol, 3-methyl-1,5-pentanediol, 1,6-hexanediol, 1,8-octanediol, 1,3-bis(2-hydroxyethoxy)benzene, 1,4-bis(2-hydroxyethoxy)benzene, neopentyl glycol, 1,4-cyclohexanediol, and 1,4-cyclohexanedimethanol. These diols may be used alone or in combination with two or more kinds.

The example of the trivalent or higher polyvalent alcohol (B) includes trimethylolpropane, trimethylolethane, pentaerythritol, ditrimethylolpropane, dipentaerythritol, glycerin, and sorbitol. The polyvalent alcohol may be an alcohol in which ethylene oxide, propylene oxide, or other alkylene oxides are added in an equivalent of 1-5 based on the hydroxyl groups of each of these polyvalent alcohols. These polyvalent alcohols may be used alone or in combination with two or more kinds.

The compound to be the carbonyl component (C) is any one selected from diester carbonate, phosgene, and these equivalents of thereof. Specifically, the compound includes diester carbonates such as dimethyl carbonate, diethyl carbonate, diisopropyl carbonate, diphenyl carbonate, ethylene carbonate, and propylene carbonate; phosgene; and halogenated formates such as methyl chloroformate, ethyl chloroformate, and phenyl chloroformate. These may be used alone or in combination with two or more kinds.

The polycarbonate polyol is synthesized by the polycondensation of the above-mentioned diol compound (A), trivalent or higher polyvalent alcohol (B), and compound to be the carbonyl component (C) under a general condition. For example, the molar ratio of the diol compound (A) to the polyvalent alcohol (B) as raw materials preferably falls within the range of 50:50-99:1. The molar ratio of the compound to be the carbonyl component (C) to the diol compound (A) and the polyvalent alcohol (B) is preferably 0.2-2 equivalents based on the hydroxyl groups of the diol compound and the polyvalent alcohol.

The number of the hydroxyl groups existing in one molecule of the polycarbonate polyol after the polycondensation conducted at the above-mentioned molar ratio is 3 or more, preferably 3-50, more preferably 3-20 on average. This range generates a required number of (meth)acrylate groups by the below-mentioned esterification and provides moderate flexibility to a polycarbonate(meth)acrylate resin. The terminal functional groups of this polycarbonate polyol are typically OH groups, but some of which may be carbonate groups.

The process of generating the above-mentioned polycarbonate polyol is described in, for example, JP 64-1726 A. This polycarbonate polyol can also be produced by the transesterification of a polycarbonate diol and a trivalent or higher polyvalent alcohol as described in JP 03-181517 A.

The molecular weight of the polycarbonate (meth)acrylate used in the present invention is measured by GPC analysis. The standard polystyrene equivalent weight-average molecular weight is preferably 500 or more, more preferably 1000 or more, furthermore preferably more than 2000. The upper limit of the weight-average molecular weight of the polycarbonate (meth)acrylate is not limited in particular, but preferably 100000 or less, more preferably 50000 or less from the viewpoint of controlling the viscosity not to be increased too much. From the viewpoint of maintaining the damage resistance as well as the three-dimensional moldability, the upper limit of the weight-average molecular weight of the polycarbonate(meth)acrylate is further more preferably more than 2000 and 50000 or less, particularly preferably 5000-20000.

Multi-Functional (Meth)Acrylate

The multi-functional (meth)acrylate used in the present invention is not limited in particular as long as being a (meth)acrylate with two or more functional groups. However, to enhance the curability, a (meth)acrylate with 3 or more functional groups is preferable. The two functional groups means herein that the number of ethylene unsaturated bonds {(meth)acryloyl groups} in a molecule is two.

The multi-functional (meth)acrylate may be an oligomer or a monomer. However, the multi-functional (meth)acrylate is preferably a multi-functional (meth)acrylate oligomer from the viewpoint of improving the three-dimensional moldability.

The above-mentioned multi-functional (meth)acrylate oligomer includes, for example, a urethane (meth)acrylate oligomer, an epoxy (meth)acrylate oligomer, a polyester (meth)acrylate oligomer, and a polyether (meth)acrylate oligomer. The urethane (meth)acrylate oligomer can be obtained, for example, by esterifying a (meth)acrylic acid with a polyurethane oligomer obtained by reacting a polyetherpolyol or a polyester polyol with a polyisocyanate. The epoxy (meth)acrylate oligomer can be obtained, for example, by esterifying a (meth)acrylic acid with the oxirane ring of a bisphenol epoxy resin or a novolac epoxy resin with a relatively low molecular weight. A carboxyl modified-epoxy (meth)acrylate oligomer obtained by partially modifying this epoxy (meth)acrylate oligomer with a dibasic carboxylic acid anhydride can be used. The polyester (meth)acrylate oligomer can be obtained, for example, by esterifying a (meth)acrylic acid with the hydroxyl groups of a polyester oligomer having hydroxyl groups at the both ends that has been obtained by condensing a polyvalent carboxylic acid with a polyvalent alcohol or by esterifying a (meth)acrylic acid with a hydroxyl group at the end of an oligomer obtained by adding an alkylene oxide to a polyvalent carboxylic acid. The polyether (meth)acrylate oligomer can be obtained by esterifying a (meth)acrylic acid with the hydroxyl groups of a polyetherpolyol.

Other multi-functional (meth)acrylate oligomers include a high hydrophobic polybutadiene (meth)acrylate oligomer with a (meth)acrylate group in the side chain of a polybutadiene oligomer; a silicone (meth)acrylate oligomer with a polysiloxane bond in the main chain; and an aminoplast resin (meth)acrylate oligomer in which an aminoplast resin with a large number of reactive groups in the small molecular is modified.

The above-mentioned multi-functional (meth)acrylate monomer includes, specifically, ethylene glycol di(meth)acrylate, propylene glycol di(meth)acrylate, 1,4-butanediol di(meth)acrylate, 1,6-hexanediol di(meth)acrylate, neopentyl glycol di(meth)acrylate, polyethylene glycol di(meth)acrylate, hydroxy pivalic acid neopentyl glycol di(meth)acrylate, dicyclopentanyl di(meth)acrylate, caprolactone-modified dicyclopentenyl di(meth)acrylate, ethylene oxide-modified phosphoric acid di(meth)acrylate, allylated cyclohexyl di(meth)acrylate, isocyanurate di(meth)acrylate, trimethylolpropane tri(meth)acrylate, ethylene oxide-modified trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, tris(acryloxyethyl) isocyanurate, propionic acid-modified dipentaerythritol penta(meth)acrylate, dipentaerythritol hexa(meth)acrylate, ethylene oxide-modified dipentaerythritol hexa(meth)acrylate, and caprolactone-modified dipentaerythritol hexa(meth)acrylate.

The above-mentioned multi-functional (meth)acrylate oligomers and monomers may be used alone or in combination of two or more kinds.

In the present invention, when the above-mentioned polycarbonate(meth)acrylate is used as the ionizing radiation curable resin, the surface protection layer preferably consists of a cured material of the above-mentioned ionizing radiation curable resin composition with a mass ratio of polycarbonate(meth)acrylate:multi-functional (meth)acrylate=98:2-70:30. If the mass ratio of polycarbonate(meth)acrylate:multi-functional (meth)acrylate is more than 98:2 (specifically if the amount of the polycarbonate(meth)acrylate is more than 98 mass %), the damage resistance may decrease. On the other hand, if the mass ratio of polycarbonate(meth)acrylate:multi-functional (meth)acrylate is less than 70:30 (in other words, if the amount of the polycarbonate(meth)acrylate is less than 70 mass %), the three-dimensional moldability may decrease. More preferably, the mass ratio of polycarbonate(meth)acrylate:multi-functional (meth)acrylate is 95:5-80:20.

Mono-Functional (Meth)Acrylate

In the present invention, a monofunctional (meth)acrylate can be optionally used together with the polyfunctional (meth)acrylate for the purpose of decreasing the viscosity of the ionizing radiation curable resin composition without departing from the scope of the present invention. The monofunctional (meth)acrylate includes, for example, methyl(meth)acrylate, ethyl(meth)acrylate, propyl(meth)acrylate, butyl(meth)acrylate, pentyl(meth)acrylate, hexyl(meth) acrylate, cyclohexyl(meth)acrylate, 2-ethylhexyl(meth) acrylate, lauryl(meth)acrylate, stearyl(meth)acrylate, and isobornyl (meth)acrylate. These monofunctional (meth) acrylates may be used alone or in combination of two or more kinds.

Acrylic Silicone (Meth)Acrylate

The acrylic silicone (meth)acrylate used as the ionizing radiation curable resin will be explained.

The acrylic silicone (meth)acrylate used in the present invention is not limited in particular as long as a part of the structure of the acrylic resin is substituted with a siloxane bond (Si—O) in one molecule and as long as the side chain and/or the ends of the main chain of the acrylic resin has two or more (meth)acryloyloxy (acryloyloxy or methacryloyloxy) groups as functional groups in one molecule.

The example of this acrylic silicone (meth)acrylate preferably includes the structure of an acrylic resin with a siloxane bond at the side chain as disclosed in JP 2007-070544 A.

The acrylic silicone (meth)acrylate used in the present invention can be synthesized, for example, by the radical copolymerization of a silicone macromonomer with a (meth) acrylate monomer in the existence of a radical polymerization initiator.

The (meth)acrylate monomer includes methyl(meth)acrylate, ethyl(meth)acrylate, propyl(meth)acrylate, butyl(meth) acrylate, 2-ethylhexyl(meth)acrylate, and glycidyl(meth) acrylate. These (meth)acrylate monomers may be used alone or in combination of two or more kinds.

The silicone macromonomer is synthesized, for example, by the anionic living polymerization of a hexa-alkyl cyclotrisiloxane in the existence of n-butyl lithium or lithium silanolate as the polymerization initiator and then by capping reaction with a silane containing a radically polymerizable unsaturated group. As the silicone macromonomer, the compound represented by the following formula (1) is suitably used;

[Formula 1]

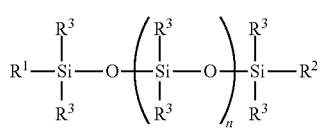

(1)

In the formula (1), $R^1$ represents an alkyl group with 1-4 carbon atoms, preferably a methyl group or an n-butyl group. $R^2$ represents a monovalent organic group, preferably —CH=CH$_2$, —C$_6$H$_4$—CH=CH$_2$, —(CH$_2$)$_3$O(CO)CH=CH$_2$, or —(CH$_2$)$_3$O(CO)C(CH$_3$)=CH$_2$. $R^3$s may be the same as or different from each other, each of which represents a hydrocarbon group with 1-6 carbon atoms, preferably an alkyl group or a phenyl group with 1-4 carbon atoms, more preferably a methyl group. The value n is not limited in particular, but the number-average molecular weight of the silicone macromonomer is preferably 1000-30000, more preferably 1000-20000.

For example, the acrylic silicone (meth)acrylate obtained by using the above-mentioned raw materials has the following structural units represented by the formulas (2), (3), and (4).

[Formula 2]

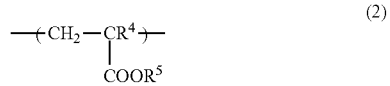

(2)

(3)

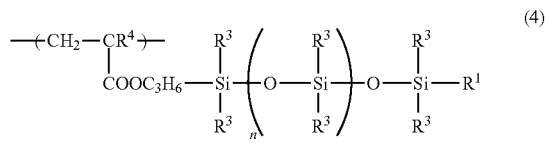

(4)

In the formulas (2), (3), and (4), $R^1$ and $R^3$ represent the same as those defined in the formula (1). $R^4$ represents a hydrogen atom or a methyl group. $R^5$ represents an alkyl group or a glycidyl group in the above-mentioned (meth) acrylate monomer or represents an alkyl group that may have a functional group such as an alkyl group or a glycidyl group in the above-mentioned (meth)acrylate monomer. $R^6$ represents an organic group with a (meth)acryloyloxy group.

The above-mentioned acrylic silicone (meth)acrylates may used alone or in combination with two or more kinds.

The molecular weight of the above-mentioned acrylic silicone (meth)acrylate is measured by GPC analysis. The standard polystyrene equivalent weight-average molecular weight is preferably 1000 or more, more preferably 2000 or more. The upper limit of the weight-average molecular weight of the acrylic silicone (meth)acrylate is not limited in particular However, the weight-average molecular weight is preferably 150000 or less, more preferably 100000 or less from the viewpoint of controlling the viscosity not to be increased too much. From the viewpoint of maintaining the three-dimensional moldability, the chemical resistance, and the damage resistance, the weight-average molecular weight is particularly 2000-100000.

The average molecular weight between the cross-linking points of the acrylic silicone (meth)acrylate is preferably 100-2500. The average molecular weight between the cross-linking points is preferably 100 or more from the viewpoint of the three-dimensional moldability and also preferably 2500 or less from the viewpoint of the chemical resistance and the damage resistance.

In the present invention, when the above-mentioned acrylic silicone (meth)acrylate is used as the ionizing radiation curable resin, the surface protection layer preferably consists of a cured material of the ionizing radiation curable resin composition with a mass ratio of acrylic silicone (meth)acrylate:multi-functional (meth)acrylate=95:5-50:50.

If the mass ratio of acrylic silicone (meth)acrylate:multi-functional (meth)acrylate is more than 95:5 (specifically if the amount of the acrylic silicone (meth)acrylate is more than 95 mass %), the damage resistance and the three-dimensional moldability may decrease. On the other hand, if the mass ratio of acrylic silicone (meth)acrylate:multi-functional (meth)acrylate is less than 50:50 (in other words, if the amount of the acrylic silicone (meth)acrylate is less than 50 mass %), the chemical resistance and the abrasion resistance may decrease. More preferably, the mass ratio of acrylic silicone (meth)acrylate:multi-functional (meth)acrylate is 90:10-75:25.

In the present invention, the above-mentioned monofunctional (meth)acrylate can be optionally used together with the polyfunctional (meth)acrylate for the purpose of decreasing the viscosity of the ionizing radiation curable resin composition without departing from the scope of the present invention.

When an ultraviolet curable resin composition is used as the ionizing radiation curable resin composition, a photopolymerization initiator is preferably added in a content of about 0.1-5 parts by mass based on 100 parts by mass of the ultraviolet curable resin. The photopolymerization initiator can be optionally selected from conventionally used ones without any particular limitations but includes, for example, benzoin, benzoin methyl ether, benzoin ethyl ether, benzoin isopropyl ether, benzoin-n-butyl ether, benzoin isobutyl ether, acetophenone, dimethylamino acetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexyl phenyl ketone, 2-methyl-1-[4-(methylthio)phenyl]-2-moruforino-puropan-1-one, 4-(2-hydroxyethoxy)phenyl-2(hydroxy-2-propyl)ketone, benzophenone, p-phenyl benzophenone, 4,4'-diethylaminobenzophenone, dichlorobenzophenone, 2-methylanthraquinone, 2-ethylanthraquinone, 2-tertiary-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyldimethylketal, and acetophenone dimethyl ketal.

For example, a photosensitizer based on a p-dimethylbenzoic acid ester, a tertiary amine, a thiol, or the like can be used.

In the present invention, an electron beam curable resin composition is preferably used as the ionizing radiation curable resin composition. The electron beam curable resin composition is allowed to be solventless and preferred from the viewpoint of environment and health. Furthermore, the electron beam curable resin composition provides stable curability without a photopolymerization initiator.

In the ionizing radiation curable resin composition forming the surface protection layer in the present invention, various additives can be mixed according to the desired physical properties of a cured resin layer to be obtained. These additives include, for example, a weather resistance improver, an abrasion resistance enhancer, a polymerization inhibitor, a cross-linking agent, an infrared absorbent, an antistatic agent, an adhesion enhancer, a leveling agent, a thixotropic agent, a coupling agent, a plasticizer, an antifoaming agent, a filler, a solvent, and a colorant.

As the weather resistance improver, an ultraviolet absorber or a photostabilizer can be used. The ultraviolet absorber may be inorganic or organic. As the inorganic ultraviolet absorber, titanium dioxide, cerium oxide, and zinc oxide, which have an average particle size of about 5-120 nm, can preferably be used. The organic ultraviolet absorber is based on, for example, a benzotriazole, specifically including 2-(2-hydroxy-5-methylphenyl)benzotriazole, 2-(2-hydroxy-3,5-di-tert-amylphenyl)benzotriazole, and 3-[3-(benzotriazole-2-yl)-5-tert-butyl-4-hydroxyphenyl]propion is acid ester of polyethylene glycol. The photostabilizer is based on, for example, a hindered amine, specifically including 2-(3,5-di-tert-butyl-4-hydroxybenzyl)-2'-n-butylmalonic acid bis(1,2,2,6,6-pentamethyl-4-piperidyl), bis(1,2,2,6,6-pentamethyl-4-piperidyl)sebacate, and tetrakis(2,2,6,6-tetramethyl-4-piperidyl)-1,2,3,4-butane tetracarboxylate. Furthermore, a reactive ultraviolet absorber and a reactive photostabilizer that have a polymerizable group such as a (meth)acryloyl group in the molecule can be used. The ultraviolet absorber and the photostabilizer can be copolymerized without impairing the properties (damage resistance and three-dimensional moldability) as the surface protection layer consisting of the polymer according to the present invention.

The abrasion resistance enhancer includes, for example, particles of inorganic substances such as α-alumina, silica, kaolinite, iron oxide, diamond, and silicon carbide. The shape of particle is not limited in particular but includes a sphere, an ellipsoid, a polyhedron, and a scale, which is preferably a sphere. The particles of organic substances include beads consisting of a synthetic resin such as a cross-linked acrylic resin or a polycarbonate resin. The particle size is typically about 30-200% of the film thickness. Particularly, spherical α-alumina is preferable in terms of the high hardness, the large effect on the improvement of the abrasion resistance, and the easy obtainability of the spherical particles.

As the polymerization inhibitor, for example, hydroquinone, p-benzoquinone, hydroquinone monomethyl ether, pyrogallol, t-butylcatechol, and the like are used. As the cross-linking agent, for example, a polyisocyanate compound, an epoxy compound, a metal chelate compound, an aziridine compound, an oxazoline compound, and the like are used.

As the filler, for example, barium sulfate, talc, clay, calcium carbonate, aluminium hydroxide, and the like are used.

As the colorant, for example, well-known color pigments such as quinacridone red, isoindolinone yellow, phthalocyanine blue, phthalocyanine green, titanium oxide, and carbon black, and the like are used.

As the infrared absorbent, for example, a dithiol metal complex, a phthalocyanine compound, a diimmonium compound, and the like are used.

Transparent Film Layer

In the second aspect of the decorative sheet of the present invention, a transparent film layer can be disposed between the above-mentioned thin metal film layer and the surface protection layer to improve the damage resistance, the chemical resistance, and the like of the decorative sheet.

This transparent film layer is preferably consists of a polyester resin from the viewpoint of the above-mentioned effect, specifically include a poly ethylene terephthalate film layer.

The thickness of the transparent film layer preferably falls within the range of 10-80 μm. The thickness of 10 μm or more can provide excellent printability. The thickness of 80 μm or less never strengthens the shrinkage force too much after vacuum forming. Therefore, even if the tensile elastic modulus of the base film is increased, the distortion of the shape can be controlled. The thickness of the transparent film layer is more preferably 20-75 μm, further more preferably 25-70 μm.

In the second aspect of the decorative sheet of the present invention, the tensile elastic modulus at 25° C. of the base film is preferably 1000 MPa more than that of the transparent film layer. When the difference between these tensile elastic moduli is more than 1000 MPa, high rigidity is provided to the base film compared with the transparent film. Therefore, after vacuum forming, the distortion of the shape caused by the contraction of the transparent film layer can be controlled. From these viewpoints, the tensile elastic modulus at 25° C. of the base film is preferably 1300 MPa more than that of the transparent film layer.

On the other hand, the upper limit of the difference of those tensile elastic moduli is typically about 2000 MPa. If this difference exceeds the upper limit, the elastic modulus of the base film increases too much. Therefore, the tension is hardly adjusted when the base film is wound off from its roll up in the continuous production, so that the slackness of the base film may hardly be removed.

The absolute value of the difference between the linear expansion coefficients at the temperature range of 41-50° C. of the transparent film layer and the base film is preferably 4/10000 or less. The absolute value of this difference of 4/10000 or less can control the distortion of the shape caused by the difference of the contraction behavior between the transparent film and the base film after the transparent film adheres to the base film or when the decorative sheet is cooled after vacuum forming. The absolute value of the difference is more preferably 1/10000 or less, ideally 0.

One side or both sides of the transparent film layer may be subjected to a so-called "easy adhesion process" for the purpose of improving the adhesion to the layer to be in contact.

Configuration of Decorative Sheet for Three-Dimensional Molding

The configuration of the decorative sheet for three-dimensional molding of the present invention will be explained in reference to FIGS. 1 and 2.

FIG. 1 shows a pattern diagram illustrating the cross section of the first aspect of the decorative sheet for three-dimensional molding of the present invention. In the first aspect, the decorative sheet for three-dimensional molding 10 of the present invention includes a thin metal film layer 2 and a surface protection layer 3 provided in this order on a base film 1. The thin metal film layer 2 is firmly attached to the surface protection layer 3 directly or through a primer layer. FIG. 1 shows the case where the thin metal film layer 2 is attached to the surface protection layer 3 through a primer layer 5. The primer layer 5 is provided as necessary, for example, when the adhesion between the thin metal film layer 2 and the surface protection layer 3 is low.

An adhesive layer 4 containing an acrylic resin and/or a vinyl chloride-vinyl acetate copolymer is preferably provided between the base film 1 and the thin metal film layer 2.

The base film 1, the thin metal film layer 2, and the surface protection layer 3 in the configuration are as described above.

Figure 2:
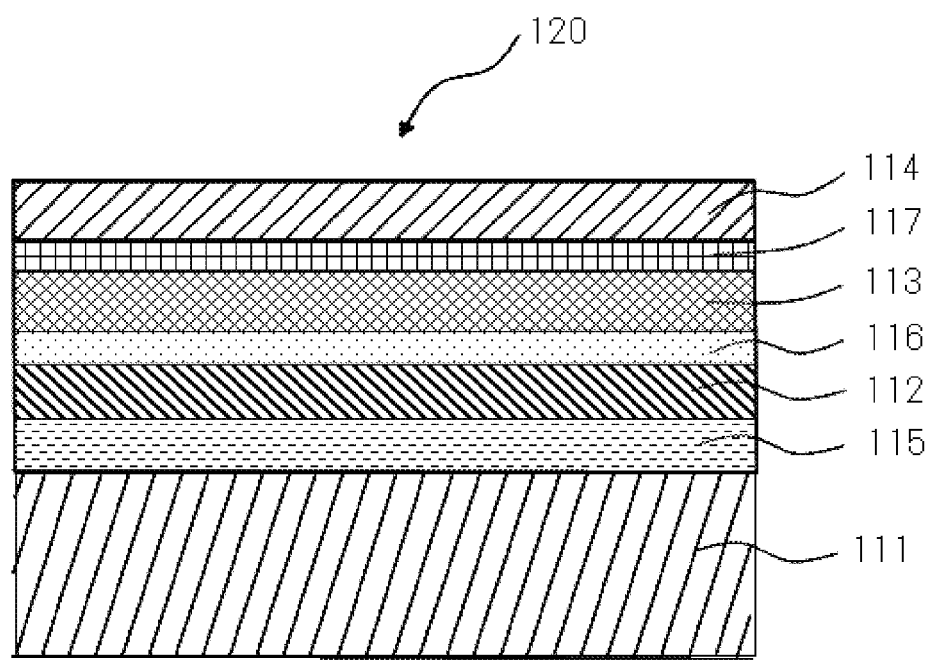
FIG. 2 shows a pattern diagram illustrating the cross section of the second aspect of the decorative sheet for three-dimensional molding of the present invention.

FIG. 2 shows a pattern diagram illustrating the cross section of the second aspect of the decorative sheet for three-dimensional molding of the present invention. The decorative sheet 120 has a thin metal film layer 112, a transparent film layer 113, and a surface protection layer 114 provided in this order on a base film 111. An adhesive layer 115 containing an acrylic resin and/or a vinyl chloride-vinyl acetate copolymer is preferably provided between the base film 111 and the thin metal film layer 112. Furthermore, a primer layer 117 is preferably provided between the transparent film layer 113 and the surface protection layer 114. Still furthermore, a primer layer 116 may be provided between the thin metal film layer 112 and the transparent film layer 113.

The base film 111, the thin metal film layer 112, the transparent film layer 113, and the surface protection layer 114 in the second aspect are as described above.

Adhesive Layer Formed Between Thin Metal Film Layer and Base Film

The adhesive layer 4 or 115 in the decorative sheet for three-dimensional molding of the present invention improves the adhesion between the base film 1 and the thin metal film layer 2 or between the base film 111 and the thin metal film layer 112. The adhesive layer is not limited in particular as long as being composed of a resin capable of improving the adhesion. For example, the adhesive layer maybe suitable for dry laminate or thermal adhesion (heat seal).

The thickness of the adhesive layer 4 or 115 is typically about 0.5-20 μm, preferably 1-5 μm.

In the first aspect shown in FIG. 1, for example, if the adhesion required for a single-layer is not obtained, the adhesive layer 4 may be multilayered. For example, the adhesive layer is two-layered in an adhesive layer 4A (not shown) consisting of a resin easily firmly attached to the thin metal film layer 2 and an adhesive layer 4B (not shown) consisting of a resin easily firmly attached to the base film 1 to provide stronger adhesion.

Even when the adhesive layer is multilayered, the entire thickness of the adhesive layer 4 is typically about 0.5-20 μm, preferably 1-5 μm as described above.

The specific example of a resin composing the adhesive layer 4 or 115 includes an acrylic resin; a polyester resin; a cellulose resin; and a vinyl chloride resin, a vinyl acetate resin, and a vinyl chloride/vinyl acetate copolymer resin (which are hereafter referred to as "vinyl resin" collectively).

In the adhesive layer, the above-mentioned resins may be used alone or in combination of two or more kinds. Among these resins, the below-mentioned vinyl resin and acrylic resin with a low acid value is preferable because of the sufficient adhesion, the high transparency, and the easy handling.

In the first aspect of the present invention, in the case of the two-layered adhesive layer 4, the above-mentioned vinyl resin as the resin used for the layer (4A) formed in contact with the thin metal film layer prevents the above-mentioned thin metal film layer 2 from becoming transparent due to the heat from the post-processing. Therefore, the average acid value of the vinyl resin is preferably adjusted. For example, when the thin metal film layer 2 is a vacuum-deposited film of tin, the vinyl resin suitably has an average acid value of 1-6 mgKOH/g (low acid value). The vinyl resin with an average acid value of 1 mgKOH/g or more preferably provides sufficient adhesion between the thin metal film layer and the base film and to an injection molding resin. On the other hand, the vinyl resin with an average acid value of 6 mgKOH/g or less preferably prevents the thin metal film layer from becoming transparent due to the heat from the post-processing. From the above-mentioned viewpoints, the average acid value of the vinyl resin is preferably 2-5 mgKOH/g.

In the case of the two or more-layered adhesive layer 4, the specific example of a resin of the adhesive layer (4B) bonded with the base film is preferably an acrylic resin and/or a vinyl chloride vinyl acetate copolymer resin from the viewpoint of the adhesion to the base film.

In the first and the second aspects, in the case of the single-layered adhesive layer, the vinyl resin suitably has an average acid value of 1-6 mgKOH/g (low acid value). The vinyl resin with an average acid value of 1 mgKOH/g or more preferably provides sufficient adhesion between the thin metal film layer and the base film and to an injection molding resin. On the other hand, the vinyl resin with an average acid value of 6 mgKOH/g or less preferably prevents the thin metal film layer from becoming transparent as described above. From the above-mentioned viewpoints, the average acid value of the vinyl resin is preferably 2-5 mgKOH/g.

The adhesive layer 4 or 115 may be mixed with a colorant for providing concealment. A colorant based on the injection resin can be used to make the boundary between the injection resin and the decorative sheet not to easily be seen so as to improve the design.

Furthermore, a coloring layer, which is not shown, may be provided between the adhesive layer 4 or 115 and the base film 1 or 111. The coloring layer may be an image layer, a solid printing layer, or a coloring layer for concealment. When the coloring layer is in the same type of color as that of the base film, the boundary between the base film and the coloring layer is made not to easily be seen in the cross section of the decorative molded sheet so as to improve the design. As a binder used for the coloring layer, the same type of binder as that of the above-mentioned adhesive layer 4 or 115 is used.

As the colorant that can be used in the above-mentioned adhesive layer 4 or 115 and the coloring layer, inorganic pigments such as carbon black (Indian ink), iron black, titanium white, antimony white, chrome yellow, titanium yellow, red iron oxide, cadmium red, ultramarine blue, and cobalt blue; organic pigments or dyes such as quinacridone red, isoindolinone yellow, and phthalocyanine blue; a metallic pigment consisting of scale-like foil of aluminum, brass, or the like; a pearlescent (pearl) pigment consisting of scale-like foil of titanium dioxide-coated mica, basic lead carbonate, or the like; and others are used without any particular limitations.

Primer Layer Formed Between Thin Metal Film Layer and Surface Protection Layer

In the first aspect of the present invention, the primer layer 5 optionally provided between the thin metal film layer 2 and the surface protection layer 3 is not limited in particular as long as being able to improve the adhesion between these layers. For example, the material of the primer layer includes an acrylic resin, a vinyl chloride vinyl acetate copolymer, polyester, polyurethane, a chlorinated polypropylene, and a chlorinated polyethylene. The primer layer is preferably formed by reacting an acrylic polyol with a multivalent isocyanate compound and then by thermally curing the obtained reactant.

As the above-mentioned multivalent isocyanate compound, for example, aromatic isocyanates such as 2,4-tolylene diisocyanate, xylylene diisocyanate, naphthalene diisocyanate, and 4,4'-diphenylmethane diisocyanate; and aliphatic (or cycloaliphatic) isocyanates such as 1,6-hexamethylene diisocyanate, 2,2,4-trimethyl hexamethylene diisocyanate, isophorone diisocyanate, hydrogenated tolylene diisocyanate, and hydrogenated diphenylmethane diisocyanate can be used. Alternatively, adducts or multimers of the above-mentioned various isocyanates, for example, an adduct and a trimer of tolylene diisocyanate can also be used.

The thickness of the primer layer 5 is typically about 0.5-20 µm, preferably 1-5 µm.

In the primer layer 5, colorants can be mixed, or the color can be adjusted to improve the design and furthermore to form a designed pattern.

In the production process, after being formed, the primer layer 5 may be wound up in a roll before the surface protection layer. In this case, the primer layer can contain a well-known blocking agent such as silica to prevent the blocking.

Primer Layer Formed Between Transparent Film Layer and Surface Protection Layer

The primer layer 117 optionally provided between the transparent film layer 113 and the surface protection layer 114 is not limited in particular as long as being able to improve the adhesion between these layers. The material of the primer layer includes an acrylic resin, a vinyl chloride vinyl acetate copolymer, polyester, polyurethane, a chlorinated polypropylene, and a chlorinated polyethylene. The primer layer is preferably formed by reacting an acrylic polymer polyol with a multivalent isocyanate compound and then by thermally curing the obtained reactant.

As the above-mentioned multivalent isocyanate compound, for example, aromatic isocyanates such as 2,4-tolylene diisocyanate, xylylene diisocyanate, naphthalene diisocyanate, and 4,4'-diphenylmethane diisocyanate; and aliphatic (or cycloaliphatic) isocyanates such as 1,6-hexamethylene diisocyanate, 2,2,4-trimethyl hexamethylene diisocyanate, isophorone diisocyanate, hydrogenated tolylene diisocyanate, and hydrogenated diphenylmethane diisocyanate can be used. Alternatively, adducts or multimers of the above-mentioned various isocyanates, for example, an adduct and a trimer of tolylene diisocyanate can also be used.

The thickness of the primer layer is typically about 0.5-20 µm, preferably 1-5 µm.

For the primer layer 117, colorants can be mixed, or the color can be adjusted to improve the design and furthermore to form a designed pattern.

In the production process, after being formed, the primer layer 117 may be wound in a roll before the surface protection layer is formed. In this case, the primer layer can contain a well-known blocking agent such as silica to prevent the blocking.

When the thin metal film layer 112 is formed, the primer layer 116 can be provided between the transparent film layer 113 and the thin metal film layer 112 to provide the adhesion. Particularly, this is effective when metal-containing paste is applied. As the material of composing the primer layer 116, various resins can be used without any particular limitations. However, the same types of resins as those composing the above-mentioned adhesive layer are suitably used. In the production process, after being formed, the primer layer may be wound in a roll. In this case, the primer layer can contain a well-known blocking agent such as silica to prevent the blocking.

Formation of Surface Protection Layer

The surface protection layer 3 or 114 provided in the decorative sheet of the present invention can be formed as follows.

A coating liquid containing the above-mentioned ionizing radiation curable resin composition is prepared. This coating liquid is applied on the layer in contact with the surface protection layer, for example, the primer layer 5 or 117, and then cross-linked and cured. The viscosity of the coating liquid is not limited in particular as long as being able to form an uncured resin layer on the surface of the primer layer 5 or 117 by the below-mentioned coating process. The prepared coating liquid is applied on the surface of the primer layer 5 or 117 by a well-known process such as gravure coating, bar coating, roll coating, reverse roll coating, or comma coating, preferably gravure coating to form an uncured resin layer with a thickness of 1-1000 µm after curing.

The resin layer formed in this way is cured through ionizing radiation such as electron beams or ultraviolet rays. When electron beams are used as the ionizing radiation, the accelerating voltage can appropriately be selected based on the resin to be used and the thickness of the layer. However, the uncured resin layer is typically preferably cured at an accelerating voltage of about 70-300 kV.

The irradiation dose when the cross-link density of the resin layer composing the surface protection layer is saturated is preferable, which is selected from the range of typically 5-300 kGy (0.5-30 Mrad), preferably 10-50 kGy (1-5 Mrad).

The electron beam source is not limited in particular. For example, various electron beam accelerators such as a Cockcroft-Walton accelerator, a van de Graaff accelerator, a resonance transformer accelerator, an insulated core transformer accelerator, a linear accelerator, a dynamitron accelerator, and a high frequency accelerator can be used. In the aspect of the present invention in which the transparent film layer 113 exists, the higher accelerating voltage increases the penetrating power more in the electron beam irradiation.

When a substrate deteriorated by electron beams is used as the transparent film layer 113, the accelerating voltage is preferably selected so that the penetration depth of electron beams is substantially equal to the thickness of the resin layer. Therefore, the transparent film layer 113 can be prevented from being excessively irradiated with electron beams to minimize the deterioration of the transparent film layer 113 due to excess electron beams.

When used as the ionizing radiation, the ultraviolet rays are preferably emitted at a wavelength of 190-380 nm. The ultraviolet ray source is not limited in particular. For example, a high-pressure mercury lamp, a low-pressure mercury lamp, a metal halide lamp, and a carbon-arc lamp can be used.

The method of producing the decorative sheet for three-dimensional molding of the present invention will be explained.

Method of Producing a Decorative Sheet for Three-Dimensional Molding

The above-mentioned method of producing a decorative sheet for three-dimensional molding of the first aspect of the present invention (hereinafter sometimes simply referred to as "method of producing a decorative sheet") can be accomplished by directly laminating or transferring each layer in order on the base film.

The method of producing a decorative sheet by transfer includes the steps of: forming a thin metal film layer on a release sheet; transferring the thin metal film layer on a base film; peeling off the release sheet from the base film; laminating an ionizing radiation curable resin composition layer on the surface of the base film, from which the release sheet has been peeled off; and cross-linking and curing the ionizing radiation curable resin composition layer to form a surface protection layer. In the above-mentioned method, a primer layer is particularly preferably provided on the release sheet, and the thin metal film layer is provided on the primer layer. The example of providing a primer layer will be explained in detail below. Specifically, another aspect of the method of producing a decorative sheet of the present invention includes the steps of: (a) forming a primer layer on a release sheet;
(b) forming a thin metal film layer on the primer layer; (c) transferring the primer layer and the thin metal film layer on a base film; (d) peeling off the release sheet from the primer layer; (e) laminating an ionizing radiation curable resin composition layer on the primer layer; and (f) cross-linking and curing the ionizing radiation curable resin composition layer to form a surface protection layer.

Step (a)

This step is to react an acrylic polyol with a multivalent isocyanate compound and then to thermally cure the obtained reactant so as to form the above-mentioned primer layer on the release treatment surface of a release sheet.

Step (b)

This step is to form a thin metal film layer on the primer layer formed in the step (a). Specifically, a metal such as indium, tin, chromium, and aluminum is deposited on the above-mentioned primer layer to form a thin metal film layer by a deposition method. Furthermore, an adhesive layer explained as the adhesive layer 4 can be provided on this thin metal film layer.

Steps (c) and (d)

The step (c) is to transfer the primer layer and the thin metal film layer on a base film so that the thin metal film layer is in contact with the base film. When an adhesive layer is provided on the thin metal film layer in the step (b), the primer layer, the thin metal film layer, and the adhesive layer are transferred on the base film so that the adhesive layer is in contact with the base film. The step (d) is to peel off the release sheet from the base film.

The adhesive layer may be previously provided on the base film not on the thin metal film layer.

Step (e)

This step is to laminate an ionizing radiation curable resin composition layer on the primer layer formed on the base film.

The ionizing radiation curable resin composition is as described above.

Step (f)

This step is to cross-link and cure the ionizing radiation curable resin composition layer formed in the step (e) through ionizing radiation to form a surface protection layer.

The process of cross-linking and curing an ionizing radiation curable resin composition layer to form a surface protection layer is as described above.

Finally, the decorative sheet for insert molding of the present invention can be effectively produced.

The method of producing a decorative sheet by direct lamination, an adhesive layer 4 is first formed on a base film 1. The adhesive layer 4 is as described above. A resin composition for forming an adhesive layer 4 is prepared and then applied to the base film 1 by a well-known process such as gravure coating, bar coating, roll coating, reverse roll coating, and comma coating to form an adhesive layer 4. The above-mentioned coloring layer can be formed before the adhesive layer 4 is formed.

Subsequently, a thin metal film layer is formed on the adhesive layer 4. The materials and the method for forming the thin metal film layer are as described below. Then, a primer layer to be formed between the thin metal film layer and the surface protection layer and then a surface protection layer is formed.

The method of producing the second aspect of a decorative sheet of the present invention will be explained below.

A thin metal film layer 112 is provided on a transparent film composing a transparent film layer 113. The transparent film layer is as described above. The transparent film may be subjected to an easy adhesion process. However, to secure the flatness of the surface on which the thin metal film layer 112 is provided, the transparent film is preferably not to be subjected to an easy adhesion process. On the other hand, the other surface is preferably subjected to an easy adhesion process from the viewpoint of the adhesion to the surface protection layer.

The materials and the method for forming the thin metal film layer 112 are described above.

Subsequently, an adhesive layer 115 is optionally provided on the thin metal film layer 112. The adhesive layer 115 is as described above. Then, a primer layer 117 is optionally provided on the side opposite to the adhesive layer 115 of the transparent film layer 113. On the primer layer, a resin composition for forming a surface protection layer is applied to form an uncured resin layer. As the process for applying the resin composition, well-known processes such as gravure coating, bar coating, roll coating, reverse roll coating, and comma coating can be used. Then the uncured resin layer is cured to form a surface protection layer 114 as described above. Subsequently, the above-mentioned adhesive layer 115 is bonded with the base film 111 to obtain the decorative sheet for three-dimensional molding of the present invention.

Finally, the decorative sheet for three-dimensional molding of the present invention can be effectively produced.

The decorative molded article of the present invention will be explained.

Decorative Molded Article

The decorative molded article of the present invention has the decorative sheet for three-dimensional molding of the present invention on a plastic substrate film, in which the base film is in contact with the plastic substrate.

Figure 3:
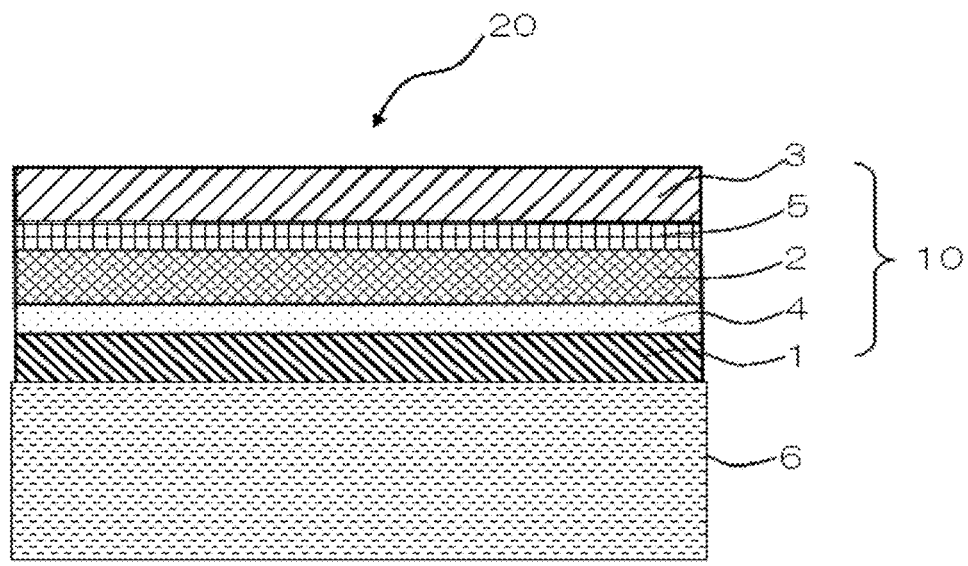
FIG. 3 shows a pattern diagram illustrating the cross section of the first aspect of a decorative molded article obtained by using the decorative sheet for three-dimensional molding of the present invention.
Figure 4:
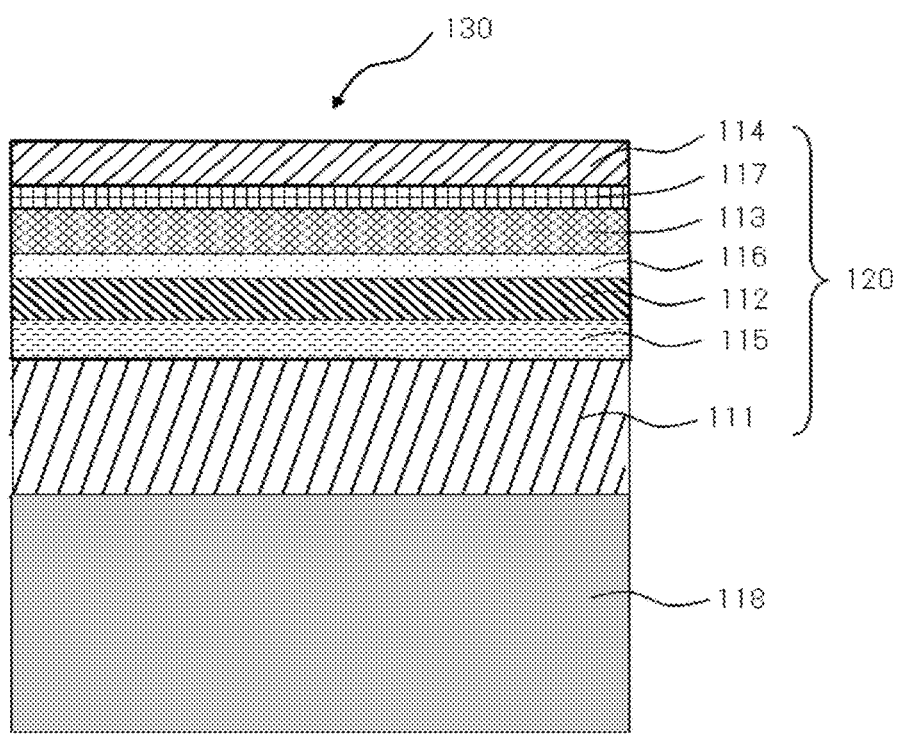
FIG. 4 shows a pattern diagram illustrating the cross section of the second aspect of a decorative molded article obtained by using the decorative sheet for three-dimensional molding of the present invention.

The decorative molded article of the present invention will be explained in reference with FIGS. 3 and 4. FIG. 3 shows a pattern diagram illustrating the cross section of the decorative molded article of the present invention formed by using the first aspect of the decorative sheet. FIG. 4 shows a pattern diagram illustrating the cross section of the decorative molded article of the present invention formed by using the second aspect of the decorative sheet with a transparent film layer. FIG. 3 shows that a decorative molded article 20 has the decorative sheet 10 for three-dimensional molding of the present invention (having optionally an adhesive layer 4, a thin metal film layer 2, optionally a primer layer 5, and a surface protection layer 3 in order on a base film 1 in this order) on a plastic substrate 6, in which the base film 1 is in contact with the plastic substrate 6.

On the other hand, FIG. 4 shows that a decorative molded article 130 has a decorative sheet 120 for three-dimensional molding of the present invention (having optionally an adhesive layer 115, a thin metal film layer 112, optionally a primer layer 116, a transparent film layer 113, optionally a primer layer 117, and a surface protection layer 114 in order on a base film 111 in this order) on a plastic substrate film 118, in which the base film 111 is in contact with the plastic substrate 118.

The method of producing a decorative molded article of the present invention will be explained.

Method of Producing Decorative Molded Article

The method of producing a decorative molded article of the present invention includes the steps of: turning the surface protection layer side of the above-mentioned decorative sheet for three-dimensional molding of the present invention to the inside of a mold and heating the decorative sheet for three-dimensional molding from the surface protection layer side with a heating platen; clamping the mold so that the heated decorative sheet for three-dimensional molding is preformed and firmly attached to the inner surface of the mold to fit on the shape of the inner surface of the mold; injecting an injection resin in the mold; and cooling the injection resin and then removing the decorative molded article from the mold.

The method of producing a decorative molded article of the present invention includes the steps of:
(1) turning the surface protection layer side of a decorative sheet for three-dimensional molding to the inside of a mold and heating the decorative sheet for three-dimensional molding from the surface protection layer side with a heating platen;
(2) clamping the mold so that the heated decorative sheet for three-dimensional molding is preformed and firmly attached to the inner surface of the mold to fit on the shape of the inner surface of the mold;
(3) injecting an injection resin in the mold; and
(4) cooling the injection resin and then removing the decorative molded article from the mold.

In the steps (1) and (2), the temperature for heating the decorative sheet for three-dimensional molding is typically about 160-190° C.

In the step (3), an injection resin is melted and then injected in the cavity to integrate the injection resin with the decorative sheet for three-dimensional molding. When being a thermoplastic resin, the injection resin is fluidized by heating and melting. When being a thermosetting resin, the uncured liquid injection resin is maintained at room temperature or optionally heated. Then, the injection resin is injected and then cooled to be solidified. Finally, the decorative sheet is integrated with and attached to the formed resin compact to produce a decorative molded article for three-dimensional molding. The heating temperature is set depending on the injection resin, generally about 180-320° C.

Another aspect of the method of producing a decorative molded article of the present invention includes the steps of: previously forming the above-mentioned decorative sheet for three-dimensional molding of the present invention in three dimensions with a vacuum forming mold; trimming excess off from the decorative sheet to obtain a molded sheet; and inserting the molded sheet in an injection mold, closing the injection mold, injecting a fluidized resin in the injection mold, and integrating this resin with the molded sheet.

This method is different from the above-mentioned method in the inclusion of the steps of vacuum forming corresponding to preforming and removing the decorative sheet from the vacuum forming mold and trimming excess off from the decorative sheet to obtain a molded sheet. This method is so-called "insert molding." The temperatures for heating the decorative sheet for three-dimensional molding and the injection resin are the same as the above-mentioned temperatures.

EXAMPLES

The present invention will be explained in more detail with reference to Examples below but is not limited thereto.

The properties of the decorative sheet for three-dimensional molding obtained in each of Examples were evaluated according to the following ways.

Evaluation of Properties of Decorative Sheet
(1) Moldability
(1-1) Moldability 1; maximum draw ratio 130%

The decorative sheet was heated and softened at 160° C. with an infrared heater. Subsequently, the decorative sheet was formed in the inner shape of the mold by vacuum forming (at a maximum draw ratio of 130%) by using a vacuum forming mold. The decorative sheet was cooled and then demolded. The criterion is as follows.

A: The shape followed the three-dimensional geometry successfully, and the shape retentivity was also excellent.

B: A minute coating crack or whitening was observed on a part of the three-dimensional part or the fully drawn part, but no practical problems were identified.

C: The shape followed the three-dimensional geometry successfully, but warpage and distortion were generated.

D: A coating crack or whitening was observed on a part of the three-dimensional part or the fully drawn part.

(1-2) Moldability 2; Maximum Draw Ratio 100%

This moldability was evaluated in the same way as the above-mentioned (1-1) except the maximum draw ratio of 100%. The criterion is as follows.

A: The shape followed the three-dimensional geometry successfully, and the shape retentivity was also excellent.

B: A minute coating crack or whitening was observed on a part of the three-dimensional part or the fully drawn part, but no practical problems were identified.

C: A minor coating crack or whitening was observed on a part of the three-dimensional part or the fully drawn part.

D: The shape could not follow the mold, and a coating crack and whitening were observed on the surface protection layer.

(2) Damage Resistance

The appearance of the test specimen was evaluated after scratched 5 times back and forth at a load of 1.5 kgf (14.7 N) with #0000 steel wool. The criterion is as follows.

A: No flaws were observed.

B: A minute flaw but no coating crack or whitening was observed on the surface.

C: A minor flaw was observed on the surface.

D: A significant flaw was observed on the surface.

(3) Chemical Resistance (3-1) Chemical Resistance 1; to Ethanol

Ethanol is added dropwise to each 10 cm×10 cm sheet piece. The appearance of the sheet piece was observed with a watch glass being covered after left for 1 hour at room temperature. The criterion is as follows.

A: No appearance changes were observed.

B: Negligible whitening and swelling were observed on the surface, but significant whitening, swelling, and dissolving were not.

C: Negligible whitening and swelling were observed on the surface.

D: Significant whitening, swelling, and dissolving were observed on the surface.

(3-2) Chemical Resistance 2; to Anti-Insect Agent

This chemical resistance was evaluated in the same way as the above-mentioned (3-1) except that 0.05 g of an anti-insect agent was applied instead of ethanol. The criterion is as follows.

A: No appearance changes were observed.

B: Negligible whitening and swelling were observed on the surface, but significant whitening, swelling, or dissolving was not.

C: Negligible whitening and swelling were observed on the surface.

D: Significant whitening, swelling, and dissolving were observed on the surface.

Weight-Average Molecular Weight and Number-Average Molecular Weight of Electron Beam Curable Resin A high speed GPC device available from TOSOH CORPORATION was used. The column used was also available from TOSOH CORPORATION, the brand name of which is "TSKgel αM." As the solvent, N-methyl-2-pyrrolidinone (NMP) was used. The measurement was conducted at a temperature of 40° C. and a flow rate of 0.5 cm³/min. The weight-average molecular weight and the number-average molecular weight in the present invention were converted into a standard polystyrene equivalent.

Average Molecular Weight Between Cross-Linking Points of Cured Electron Beam Curable Resin The average molecular weight between the cross-linking points was calculated by dividing the number-average molecular weight obtained as described above by the number of functional groups.

Physical Properties of Base Film and Transparent Film (1) Measurement of Tensile Elastic Modulus The decorative sheet obtained in each of Examples and Comparative Examples was cut out to obtain a sample in "JIS K6251 No. 1 dumbbell" shape. The tensile elastic modulus was measured at an interchuck distance of 80 mm and a test rate of 50 ram/min with a TENSILON universal testing instrument available from A&D Company, Limited.

(2) Measurement of Linear Expansion Coefficient

The decorative sheet obtained in each of Examples and Comparative Examples was cut out to obtain a sample in a strip shape with a width of 3 mm and a length of 15 mm. The expansion coefficient was measured in a tensile mode with a load capacity of 3 g at an interchuck distance of 10 mm and a test rate of 10° C./min by using a thermomechanical analyzer (TMA). Subsequently, the average linear expansion coefficient at 41-50° C. was determined.

As the electron beam curable resin EB1, the mixture of a polycarbonate acrylate with two functional groups (weight-average molecular weight: 10000) and a urethane acrylate oligomer with six functional groups (weight-average molecular weight: 6000) in amass ratio of 80:20 was used. As the electron beam curable resin EB2, the mixture of an acrylic silicone acrylate (weight-average molecular weight: 20000, average molecular weight between cross-linking points after curing: 200) and a urethane acrylate oligomer with six functional groups (weight-average molecular weight: 5000) in a mass ratio of 70:30 was used.

Example 1

The mold release layer of biaxially-oriented PET (thickness: 25 μm, arithmetic mean roughness Ra: 0.01 μm) with a silicone mold release layer provided on the surface as the release sheet was coated with an acryl/urethane block copolymer resin to form a transparent primer layer 5 with a thickness of 2 μm.

Tin was deposited on this primer layer 5 to form a thin metal film layer 2. The thin metal film layer was coated with a vinyl chloride/vinyl acetate copolymer resin with an average acid value of 5.6 by reverse coating to provide a thermal adhesion layer (adhesive layer 4A) on the thin metal film layer. On the thermal adhesion layer, an adhesive consisting of an acrylic resin and a vinyl chloride/vinyl acetate copolymer resin (mass ratio: 2:8) was applied to form an adhesive layer (adhesive layer 4B) so as to obtain an adhesive layer 4. The adhesive layer 4 side of the sheet obtained in this way, in which the primer layer 5, the thin metal film layer 2, and the adhesive layer 4 are provided on the release sheet, was brought into contact with a base film 1 consisting of an ABS resin with a thickness of 300 μm. Hot pressing was conducted at 150° C. under a pressure of 0.5 Mpa for 10 minutes by using a hot press machine with a stainless steel mirror plate with an arithmetic mean roughness Ra of 0.05 μm for the primer layer (front surface) side and with a pear skin-finished stainless metal plate with an arithmetic mean roughness Ra of 4.0 μm and a ten-point mean roughness RzJIS of 16 μm for the base film (back surface) side.

After the hot pressing, the release sheet was peeled off, and then the primer layer 5, the thin metal film layer 2, and the adhesive layer 4 were transferred the base film 1.

The surface of the primer layer after the release sheet was released was coated with an ionizing radiation curable resin composition shown in Table 1-1 by gravure reverse so that the thickness after curing was 10 μm. This uncured resin layer was irradiated with electron beams with an irradiation dose of 50 kGy (5 Mrad) at an accelerating voltage of 165 kV to cure the electron beam curable resin composition so as to form a surface protection layer. Finally, a decorative sheet for three-dimensional molding of the present invention was obtained. The properties of the decorative sheet are shown in Table 1-1.

Example 2

Except that the electron beam curable resin composition forming a surface protection layer shown in Table 1-1 was used, the decorative sheet for three-dimensional molding of the present invention was obtained in the same way as Example 1. The properties of the obtained decorative sheet are shown in Table 1.

Example 3

Polyethylene terephthalate (hereafter referred to as "PET") film (thickness: 25 μm, easy-adhesion processed on one side only) as the transparent film was prepared. Tin was deposited on the side of the PET film, on which no easy-adhesion was processed, to provide a thin metal film layer. The thickness of the thin metal film layer was expressed as an optical density (OD) value of 0.7-1.4.

Subsequently, the thin metal film layer was coated with a vinyl chloride/vinyl acetate copolymer resin with an average acid value of 5.6 by reverse coating to provide a thermal adhesion layer (corresponding to the adhesive layer 4A) on the thin metal film layer. On the thermal adhesion layer, an adhesive consisting of an acrylic resin and a vinyl chloride/vinyl acetate copolymer resin (mass ratio: 2:8) was applied to form an adhesive layer (corresponding to the adhesive layer 4B) so as to obtain an adhesive layer.

Subsequently, the easy-adhesion processed side of the PET film was coated with a two-liquid polyurethane curable resin (polyester as the base compound and hexamethylene diisocyanate as the curing agent) by reverse coating to obtain a primer layer. The primer layer was coated with an ionizing beam curable resin composition shown in Table 1 by gravure reverse so that the thickness after curing was 10 μm. This uncured resin layer was irradiated with electron beams with an irradiation dose of 50 kGy (5 Mrad) at an accelerating voltage of 165 kV to cure the electron beam curable resin composition so as to form a surface protection layer.

Subsequently, the above-mentioned adhesive layer was attached to a base film consisting of an ABS resin with a thickness of 300 μm. Finally, a decorative sheet for three-dimensional molding was obtained. The properties of the obtained decorative sheet are shown in Table 1-1.

Example 4

Polyethylene terephthalate (hereafter referred to as "PET") film (thickness: 25 μm, easy-adhesion processed on one side only) as the transparent film layer 113 was prepared. Tin was deposited on the side of the PET film, on which any easy-adhesions were not processed to provide a thin metal film layer 112. The thickness of the thin metal film layer 112 was expressed as an optical density (OD) value of 0.7-1.4.

Subsequently, the thin metal film layer was coated with a vinyl chloride/vinyl acetate copolymer resin with an average acid value of 5.6 by reverse coating to provide a heat sealing layer on the thin metal film layer 112. On the heat sealing layer, an adhesive consisting of an acrylic resin and a vinyl chloride/vinyl acetate copolymer resin (mass ratio: 2:8) was coated to obtain an adhesive layer 115.

Subsequently, the easy-adhesion processed side of the PET film was coated with a two-liquid polyurethane curable resin (polyester as the base compound and hexamethylene diisocyanate as the curing agent) by reverse coating to obtain a primer layer 117. The primer layer 117 was coated with an electron beam curable resin composition shown in Table 1-1 by gravure reverse so that the thickness after curing was 10 μm. This uncured resin layer was irradiated with electron beams with an irradiation dose of 50 kGy (5 Mrad) at an accelerating voltage of 165 kV to cure the electron beam curable resin composition so as to form a surface protection layer 114.

Subsequently, the adhesive 115 layer was attached to a base film consisting of an ABS resin with a thickness of 300 μm and with the tensile elastic modulus and the linear expansion coefficient shown in Table 1-1. Finally, the decorative sheet for three-dimensional molding of the present invention provided with a transparent film layer was obtained.

The properties of the obtained decorative sheet are shown in Table 1-1.

Example 5

Except that the thickness of the transparent film layer and the material of the base film were used as shown in Table 1-1, the decorative sheet for three-dimensional molding of the present invention was obtained in the same way as Example 4. The properties of the decorative sheet are shown in Table 1-1.

Example 6

Except that the material of the electron beam curable resin composition was used as shown in Table 1-1, the decorative sheet for three-dimensional molding of the present invention was obtained in the same way as Example 4. The properties of the decorative sheet are shown in Table 1-1.

Comparative Example 1

Except that the electron beam curable resin composition forming a surface protection layer was used as shown in Table 1-2, a decorative sheet for three-dimensional molding was obtained in the same way as Example 3. The properties of the decorative sheet are shown in Table 1-2.

Comparative Example 2

Except that no surface protection layers were not formed, a decorative sheet for three-dimensional molding was obtained in the same way as Example 3. The properties of the decorative sheet are shown in Table 1-2.

Comparative Example 3

Except that a transparent acrylic film with a thickness of 100 μm was used instead of a transparent PET film, a decorative sheet for three-dimensional molding was obtained in the same way as Comparative Example 2. The properties of the decorative sheet are shown in Table 1-2.

TABLE 1-1

| | | Examples | | | | | |
|---|---|---|---|---|---|---|---|
| | | 1 | 2 | 3 | 4 | 5 | 6 |
| Type of surface protection layer | | EB1 | EB2 | EB1 | EB1 | EB2 | EB2 |
| Transparent film | Type | — | — | PET | PET | PET | PET |
| | Tensile elastic modulus (MPa) | — | — | 800 | 800 | 800 | 800 |
| | Linear expansion coefficient | — | — | $6 \times 10^{-5}$ | $6 \times 10^{-5}$ | $6 \times 10^{-5}$ | $6 \times 10^{-5}$ |
| | Thickness (μm) | — | — | 25 | 50 | 25 | 50 |
| Base film | Type | ABS | ABS | ABS | ABS | ABS | ABS |
| | Tensile elastic modulus (MPa) | 2200 | 2200 | 2200 | 1000 | 2200 | 1000 |
| | Linear expansion coefficient | $8 \times 10^{-5}$ | $8 \times 10^{-5}$ | $8 \times 10^{-5}$ | $10 \times 10^{-5}$ | $8 \times 10^{-5}$ | $10 \times 10^{-5}$ |
| | Thickness (μm) | 300 | 300 | 300 | 300 | 300 | 300 |
| Evaluation of properties of decorative sheet | Moldability 1 | A | B | C | — | — | — |
| | Moldability 2 | A | — | B | B | B | B |
| | Damage resistance | A | B | A | A | B | B |
| | Chemical resistance 1 | B | A | B | — | — | — |
| | Chemical resistance 2 | — | — | D | B | A | A |

TABLE 1-2

| | | Comparative Examples | | |
|---|---|---|---|---|
| | | 1 | 2 | 3 |
| Type of surface protection layer | | EB3 | — | — |
| Transparent film | Type | PET | PET | acrylic film |
| | Tensile elastic modulus (MPa) | 800 | 800 | 2000 |
| | Linear expansion coefficient | $6 \times 10^{-5}$ | $6 \times 10^{-5}$ | $7 \times 10^{-5}$ |
| | Thickness (μm) | 25 | 25 | 100 |
| Base film | Type | ABS | ABS | ABS |
| | Tensile elastic modulus (MPa) | 2200 | 2200 | 1000 |
| | Linear expansion coefficient | $8 \times 10^{-5}$ | $8 \times 10^{-5}$ | $10 \times 10^{-5}$ |
| | Thickness (μm) | 300 | 300 | 300 |
| Evaluation of properties of decorative sheet | Moldability 1 | D | C | A |
| | Moldability 2 | — | B | A |
| | Damage resistance | A | D | D |
| | Chemical resistance 1 | A | A | D |
| | Chemical resistance 2 | — | B | D |

EB1: Mixture of a polycarbonate acrylate with two functional groups (weight-average molecular weight: 10000) and a urethane acrylate oligomer with six functional groups (weight-average molecular weight: 6000) in a mass ratio of 80:20

EB2: Mixture of an acrylic silicone acrylate (weight-average molecular weight: 20000, average molecular weight between cross-linking points: 200) and a urethane acrylate oligomer with six functional groups (weight-average molecular weight: 5000) in a mass ratio of 70:30

EB3: Urethane acrylate oligomer with six functional groups (weight-average molecular weight: 2000)

Examples 7 and 8

Each of two kinds of decorative sheets respectively obtained in Examples 1 and 2 were heated at a heating platen temperature of 170° C. and molded to fit the heated decorative sheet on the shape of the inner surface of the mold. The surface protection layer side of the decorative sheet was firmly attached to the inner surface of the mold. The mold with a size of 80 mm square, a height of 10 mm, a high aperture, and the shape of a tray with a corner R of 2 was used. On the other hand, an ABS resin ("KRALASTIC MTH-2 (brand name)" available from NIPPON A&L INC.) was used as the injection resin, melted at 230° C., and then injected in the cavity. After the injection resin was solidified, the decorative molded article was removed from the mold to obtain a decorative molded article with the configuration shown in FIG. 3.

Examples 9-12

Each of four kinds of decorative sheets respectively obtained in Examples 3-6 were heated at a heating platen temperature of 170° C. and molded to fit the heated decorative sheet on the shape of the inner surface of the mold. The surface protection layer side of the decorative sheet was firmly attached to the inner surface of the mold. The mold with a size of 80 mm square, a height of 10 mm, a high aperture, and the shape of a tray with a corner R of 2 was used. On the other hand, an ABS resin ("KRALASTICR MTH-2 (brand name)" available from NIPPON A&L INC.) was used as the injection resin, melted at 230° C., and then injected in the cavity. When the mold temperature was reduced to 30° C., the decorative molded article was removed from the mold to obtain four kinds of decorative molded articles with the configuration shown in FIG. 4.

INDUSTRIAL APPLICABILITY

The decorative sheet for three-dimensional molding of the present invention has excellent moldability, which is used for three-dimensional molding. Therefore, the decorative sheet for three-dimensional molding of the present invention can provide a decorative molded article with a metallic style in excellent design and with excellent abrasion resistance. This decorative molded article is used, for example, as a substitute of an article such as a grille of a car.

REFERENCE SIGNS LIST

1,111 base film
2,112 thin metal film layer 3,114 surface protection layer
4,115 adhesive layer
5,116,117 primer layer
6,118 plastic substrate
10,120 decorative sheet for three-dimensional molding
20,130 decorative molded article
113 transparent film layer

The invention claimed is:

1. A decorative sheet for three-dimensional molding, comprising: a thin metal film layer, a surface protection layer, and a base film, at least the thin metal film layer and the surface protection layer being disposed on the base film in this order,
wherein the surface protection layer comprises a cured material of an ionizing radiation curable resin composition containing (A) polycarbonate(meth)acrylate and a multi-functional (meth)acrylate and/or (B) an acrylic silicone (meth)acrylate,
wherein, when the ionizing radiation curable resin composition contains (A) the polycarbonate(meth)acylate and the multi-functional (meth)acrylate, the mass ratio of the polycarbonate(meth) acrylate to the multi-functional (meth)acrylate is 95:5-70:30,
wherein the weight-average molecular weight of the polycarbonate(meth)acrylate is 5,000-50,000,
wherein the acrylic silicone (meth)acrylate comprises a main chain comprising an acrylic resin, at least a part of a structure of the acrylic resin comprises a siloxane bond (Si—O), and a side chain and/or ends of a main chain of the acrylic resin comprises two or more (meth)acryloyloxy groups as functional groups,
wherein the acrylic silicone (meth)acrylate comprises the following structural units represented by the formulas (2), (3), and (4):

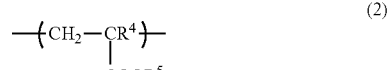

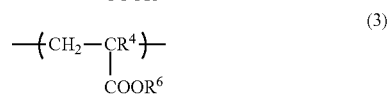

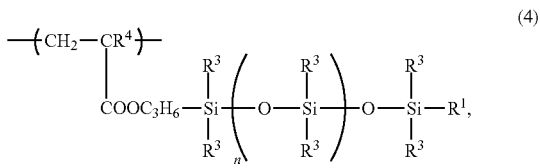

and
wherein $R^1$ represents an alkyl group with 1-4 carbon atoms,
wherein $R^3$s may be the same as or different from each other, each of which represents a hydrocarbon group with 1-6 carbon atoms,
wherein $R^4$ represents a hydrogen atom or a methyl group,
wherein $R^5$ represents an alkyl group that may have a functional group, or a glycidyl group, and
wherein $R^6$ represents an organic group with a (meth)acryloyloxy group.

2. The decorative sheet for three-dimensional molding according to claim 1, wherein the thin metal film layer is attached to the surface protection layer directly or through a primer layer.

3. The decorative sheet for three-dimensional molding according to claim 1, further comprising a transparent film layer between the thin metal film layer and the surface protection layer.

4. The decorative sheet for three-dimensional molding according to claim 3, wherein the base film has a tensile elastic modulus of 1000 MPa at 25° C. more than the transparent film layer.

5. The decorative sheet for three-dimensional molding according to claim 3, wherein the absolute value of the difference between the linear expansion coefficients at the temperature range of 41-50° C. of the transparent film layer and the base film is 4/10000 or less.

6. The decorative sheet for three-dimensional molding according to claim 3, further comprising a primer layer between the transparent film layer and the surface protection layer.

7. The decorative sheet for three-dimensional molding according to claim 3, wherein the transparent film layer is a polyester resin film layer.

8. The decorative sheet for three-dimensional molding according to claim 1, wherein the ionizing radiation curable resin composition contains (B) the acrylic silicone (meth)acrylate and additionally a multi-functional (meth)acrylate.

9. The decorative sheet for three-dimensional molding according to claim 8, wherein the multi-functional (meth)acrylate has three or more functional groups.

10. The decorative sheet for three-dimensional molding according to claim 1, wherein the thin metal film layer is made of indium, tin, chromium, or aluminum.

11. The decorative sheet for three-dimensional molding according to claim 1, further comprising an adhesive layer containing an acrylic resin and/or a vinyl chloride-vinyl acetate copolymer between the base film and the thin metal film layer.

12. A decorative resin-molded article formed by using the decorative sheet for three-dimensional molding according to claim 1.

13. The decorative sheet for three-dimensional molding according to claim 3, further comprising an adhesive layer containing an acrylic resin and/or a vinyl chloride-vinyl acetate copolymer between the base film and the thin metal film layer.

14. The decorative sheet for three-dimensional molding according to claim 1, wherein the cured material is of the ionizing radiation curable resin composition containing (B) the acrylic silicone (meth)acrylate.

* * * * *